(12) United States Patent
Abboud et al.

(10) Patent No.: US 7,080,774 B1
(45) Date of Patent: Jul. 25, 2006

(54) APPARATUS FOR PROVIDING AN ELECTRONIC DISPLAY WITH SELECTABLE VIEWING ORIENTATIONS

(75) Inventors: Joseph Abboud, Bellevue, NE (US); Courtney Donnell, Bellevue, NE (US)

(73) Assignee: Wu Li Investments, Las Vagas, NV (US)

( * ) Notice: Subject to any disclaimer, the term of this patent is extended or adjusted under 35 U.S.C. 154(b) by 0 days.

(21) Appl. No.: 09/441,834

(22) Filed: Nov. 17, 1999

(51) Int. Cl.
*G06F 19/00* (2006.01)

(52) U.S. Cl. ........................................ 235/379; 902/30
(58) Field of Classification Search ................ 735/379; 902/30–35; 108/50.01
See application file for complete search history.

(56) References Cited

U.S. PATENT DOCUMENTS

| | | | |
|---|---|---|---|
| 4,831,368 A | 5/1989 | Masimo et al. | |
| 5,452,950 A | 9/1995 | Crenshaw et al. | |
| 5,655,822 A | 8/1997 | Roberts | |
| 5,784,252 A | 7/1998 | Villa et al. | |
| 5,790,371 A | 8/1998 | Latocha et al. | |
| 5,793,877 A | 8/1998 | Tagg | |
| 5,813,914 A | 9/1998 | McKay et al. | |
| 5,844,772 A | 12/1998 | Lee et al. | |
| 5,879,235 A | 3/1999 | Kaneko et al. | |
| 5,926,154 A | 7/1999 | Hirono | |
| 5,950,173 A | 9/1999 | Perkowski | |
| 6,115,025 A | 9/2000 | Buxton | |
| 6,522,772 B1 * | 2/2003 | Morrison et al. | 382/124 |

FOREIGN PATENT DOCUMENTS

| | | |
|---|---|---|
| TW | 358345 | 5/1999 |
| WO | WO 97/15213 | * 10/1995 |

OTHER PUBLICATIONS

International Search Report dated Dec. 15, 2000.
Portrait Displays—Press Release Apr. 17, 1998.

* cited by examiner

*Primary Examiner*—Karl D. Frech
(74) *Attorney, Agent, or Firm*—Darby & Darby

(57) ABSTRACT

A table is provided which houses a computer system including a display, a plurality of input and output devices, and one or more viewing orientation controls. The display is provided within the frame of the table in a substantially vertical alignment and under a flat surface which is made of a transparent or translucent material, such as plastic. The flat surface allows for viewing of the display from any seating position at the table, and further may protect the display from any fluids that may be spilled or sprayed onto the flat surface. The input and output devices may be provided within enclosures which prevent damage from fluids, yet still allow user access. The viewing orientation controls allow a plurality of users to rotate the display or an image on the display so that the image is oriented to a specific seating position. The computer may be connected to a network system, such as the Internet, so as to allow user interaction with a multitude of internal or external data sources. A plurality of such tables may be further networked together and controllable by a central server. Each table may accept the input of coins, currency, credit cards, debit cards, financial account identifiers and the like for making payments via the computer system. The table is especially suited for use in a restaurant, a cafe, a pub and the like so that patrons may dine while using the computer system.

52 Claims, 7 Drawing Sheets

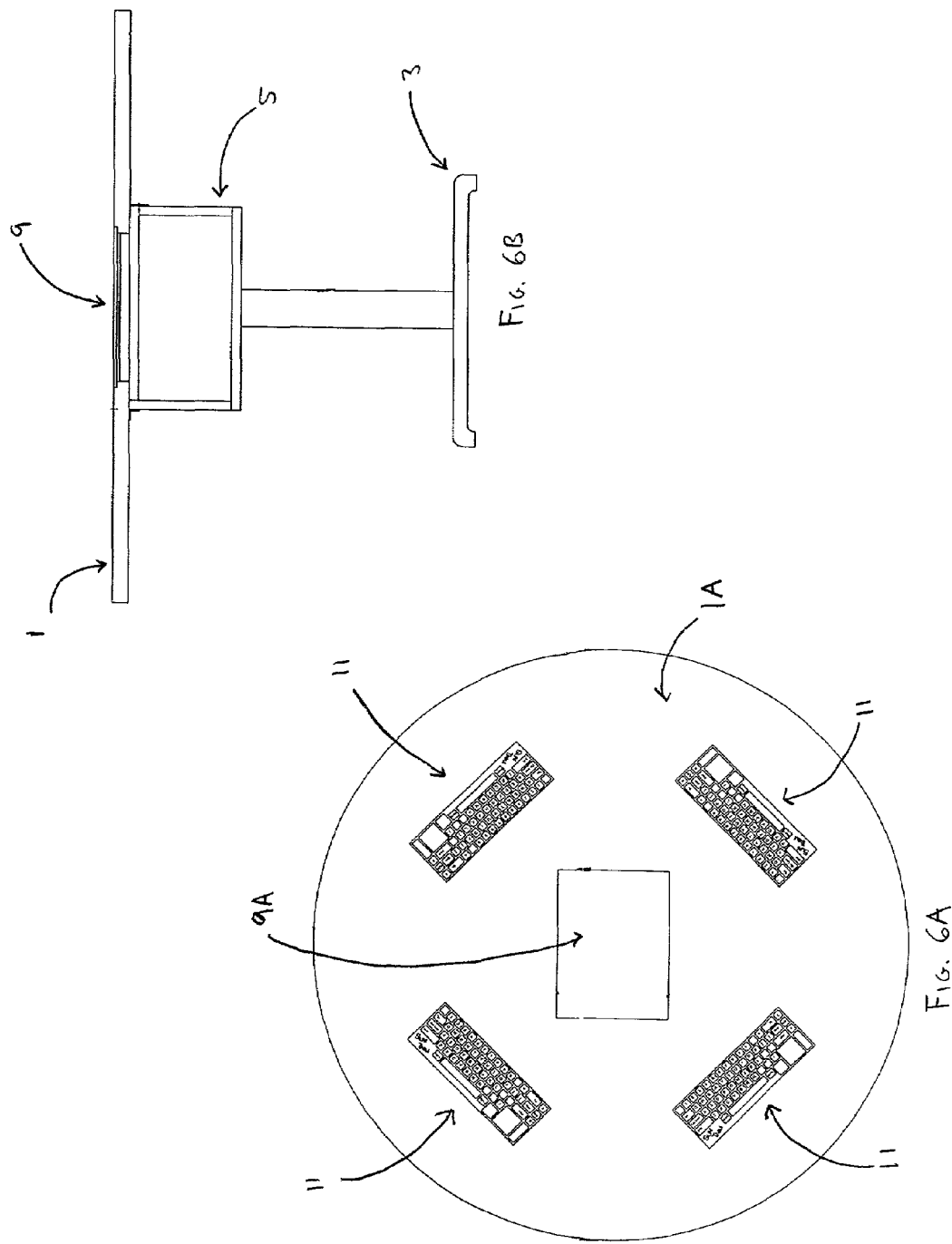

APPARATUS FOR PROVIDING AN ELECTRONIC DISPLAY WITH SELECTABLE VIEWING ORIENTATIONS

BACKGROUND OF THE INVENTION

1. Field of the Invention

The present invention relates to electrical computers and data processing systems, and relates more particularly to a display console for electrical computers that provides controls for multiple selectable viewing orientations.

2. Description of the Related Art

As the popularity of the Internet and other online information sources increases, there has been a corresponding increase in the demand for different avenues of connectivity to the same. Online data providers produce instantaneous updates in the areas of news, weather, sports, stock market information, and the like 24 hours a day. Millions of subscribers worldwide also send and receive personal or professional e-mail notifications on a 24 hour basis. However, subscriber access to this continuous flow of information is limited to those times when they have access to a computer terminal that has online capability. Typically, subscribers only have access to such a computer terminal when they are at home or at their workplace. When subscribers are not at these locations, they face the inability to access online data. Thus, access to online information becomes problematic in a variety of locations, including for example, dining and entertainment venues.

At the same time, dining establishments and entertainment venues, such as restaurants, bars, pubs, coffeehouses and the like, are constantly seeking new promotions to attract more customers and, in turn, to generate more revenue. For example, thousands of such establishments now offer online, nationwide, interactive trivia games, such as those provided by NTN COMMUNICATIONS. Other establishments have included video games, vending machines and the like to produce additional revenue. Certain establishments also provide computers with Internet access at particular locations within the establishment, so that customers may access online data.

A particular problem with providing online connectivity within dining and entertainment venues is that computer terminals take up an already limited amount of tabletop and/or floor space. A monitor for a standard computer terminal alone can take up to half the available useful area on a typical dining table. When terminals are placed adjacent to, rather than on such a table, a significant amount of floor space becomes unusable for other purposes such as access by wait staff, room for customers to move about, etc.

In one attempt to solve this problem, particular video games have been introduced in tabletop form and provided to restaurants and the like in order to entertain customers and to generate revenue from the fees charged for playing these games. Such video games, like PAC-MAN which is produced by ATARI, typically provide a flat tabletop with a clear surface so that customers may sit at the table in front of a set of controls and play the game. Such video game tables, however, are problematic in that they are typically bulky, take much floor space, provide limited functionality and have power cords protruding from the sides thereof which make them unsightly if used in the general dining area. These video games also do not provide the ability for users to selectively change a viewing orientation of the image on a display. This, in turn, means that a group of such users seated at various positions around the table may not adjust the image's orientation so as to accommodate each user's view, thus some of the users will have a poor view of the screen. The prior screen display orientations are generally dictated by the device. Convenient viewing of an image by a group of users is, therefore, problematic in tabletop machines of the prior art. These features of prior art video games make them unpopular for widespread use within dining and entertainment establishments.

Because of subscribers' increased demand for online connectivity at a variety of locations and a general inability to accommodate viewing of tabletop images by a group of users, coupled with the desire of dining and entertainment venues to increase revenue while sparing floor or table space as well as preserving the atmosphere of the venue, there is a need for an apparatus which minimizes or eliminates the foregoing problems.

BRIEF SUMMARY OF THE INVENTION

In order to address and solve certain of these shortcomings in the prior art, one embodiment of the present invention provides an apparatus for housing an interactive computer system which includes a tabletop having a frame therein for supporting a display. The apparatus includes a base for supporting at least a portion of the tabletop. The base has a first end, a second end and a first hollow section disposed between the first and second ends. The hollow section may allow a cord to be inserted therein which provides, for example, a network communication line, a telecommunications line and/or an electrical power line for use by the display. The tabletop further includes a second hollow section disposed between the base and the display for allowing the cord to reach the display.

A second embodiment of the present invention includes an interactive computer system which is disposed within a tabletop. A display is disposed within the tabletop for providing an image to a user. The system further has a viewing orientation selector for changing an orientation of the image to accommodate a plurality of seating positions around the tabletop.

Furthermore embodiments of the present invention provide a frame that allows the display to be oriented in a substantially vertical alignment to the horizontal face of the tabletop. However, the display may be oriented at a predetermined angle (i.e. 160 degrees) from a seating position of the tabletop in order to accommodate viewing from that position.

In a further embodiment of the present invention, the tabletop includes a water-tight, flat surface disposed above the tabletop for enclosing the display within the tabletop. The surface may be made of a transparent or translucent material, such as a plastic, so that the display is visible under the surface.

In yet a further embodiment of the present invention, the tabletop includes a central processing system within the frame. However, hard-wired or wireless input devices may be provided for accessing a remote computing device from the tabletop. The remote computing device may, in turn, send display signals via a hard-wired or wireless connection to the display.

The central processing system may store a user's login data for a predetermined time. For example, the central processing system may retain all user-entered data until the user logs off the system.

Examples of input devices for use with an embodiment of the tabletop device include a keyboard, which may be affixed to the tabletop or may communicate with a local or remote computing device via a wireless connection disposed within the tabletop. Where the keyboard is affixed, it may be provided within a water-tight covering so as to prevent damage to the keyboard by liquid and the like. Other input devices include a viewing orientation selector, a lockout device for preventing other user inputs and/or a change in a viewing orientation of the display, a touch, a touch pad, a touch-screen, a mouse and a camera.

In yet a further embodiment of the present invention, an output device may be provided with a hard-wired or wireless connection to the central processing system controlling the display. Examples of such output devices include a speaker, a television signal receiver, a radio signal receiver and a printer.

In still further embodiments of the present invention, a currency acceptor is provided for receiving a currency value from the user operating the tabletop display. The currency acceptor may be a physical device or may be software which receives and processes payments from a financial account identifier and the like. An exemplary currency acceptor accepts such currency values from one or more of: a deposited coin, a deposited currency note, a credit card, a debit card, a smart card, a telephone calling card and a pre-paid telephone card. The currency value may be received as a payment for a service, such as Internet access, a game run on the central processing system, telephone service, a rental of an input device, a restaurant bill, or a product ordered through the central processing system.

In a still further embodiment of the present invention, the display and central processing system are operatively connected to a network such as a local-area network, a wide-area network, the Internet and an Intranet. A central server allowing online connection from the tabletop device may be programmed to limit access to certain information available on the network, such as information that may be objectionable to certain users.

In still another embodiment of the present invention, the tabletop may further include a telephone device for placing and receiving telephone calls. The telephone device may be a standard telephone, an Internet telephone device of the type provided by NET2PHONE, or a cellular or digital wireless telephone device.

BRIEF DESCRIPTION OF THE SEVERAL VIEWS OF THE DRAWINGS

Further aspects of the instant invention will be more readily appreciated upon review of the detailed description of the preferred embodiments included below when taken in conjunction with the accompanying drawings, of which:

FIGS. 6A and 6B are an exemplary illustration of the top view and side view, respectively, of a third embodiment of the tabletop device of the present invention.

DETAILED DESCRIPTION OF THE INVENTION

Referring now to FIGS. 1–7B, wherein similar components of the instant invention are referenced in like manner, a preferred apparatus for providing a tabletop electronic display with selectable viewing orientations is disclosed.

Figure 1:
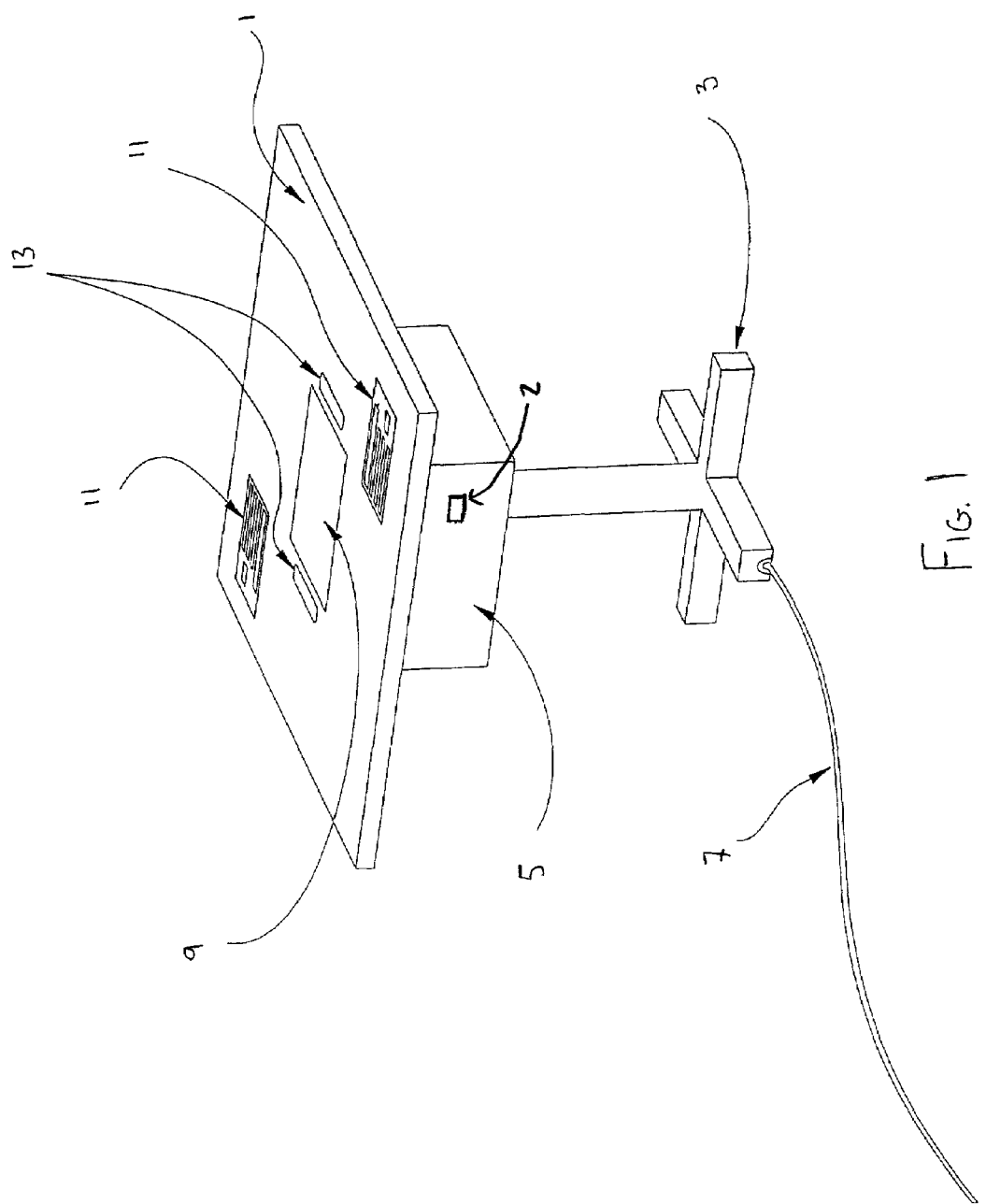
FIG. 1 is an illustration of a first embodiment of a tabletop device of the present invention.

Turning now to FIG. 1, depicted therein is a tabletop 1 and display 9 according to one embodiment of the instant invention. Although the tabletop 1 is depicted in a square or rectangular shape, it may be provided in any useful shape, as described further in conjunction with and exemplified by FIGS. 4A through 7. Tabletop 1 is supported by a base 3, which may include any number of legs, or any other type of support for a table. Tabletop 1 and base 3 preferably have one or more hollow section for accommodating a cord 7 which may provide electrical power, two-way telephone and/or computer data and the like to any device housed by tabletop 1. The cord 7 may be connected at a first end to devices within tabletop 1 and may further be connected at a second end to a power source (not shown), a network server (not shown), an Internet service provider (not shown), an external telecommunications line (not shown) and the like.

Devices which are housed by tabletop 1 in conjunction with frame 5 may include the display 9, one or more input devices 11 and one or more output devices 13. Frame 5 may be provided separately from tabletop 1, or in the alternative, may be a physical component of tabletop 1. In either event, frame 5 encloses a portion of the devices which may protrude from the bottom of tabletop 1.

Display 9 may be any standard computer monitor, a flat screen monitor, an LCD display, a television display and the like. Other types of useful monitors and displays will be apparent to one of ordinary skill in the art.

Input devices 11 may include one or more of a keyboard, a keyboard with a water-proof, water-resistant or water-tight cover, a wireless keyboard, a viewing orientation selector, a lockout device for preventing a change in a viewing orientation of the display, a receiver for receiving wireless input signals from a remote input device, a touch pad, a touch-screen, a mouse and a digital camera. Any one or more of the foregoing devices may be included. In addition, any one or more of the foregoing devices may be permanently affixed or detachable from tabletop 1. Other devices useful for input devices 11 will be apparent to one of ordinary skill in the art.

Output devices 13 may be, but are not limited to, any one or more of the following devices: a speaker, an audio signal player or a printer. Output devices may be operative to provide information in audio, visual or printed form to a user of the devices of tabletop 1. Output devices 13 may be permanently affixed or detachable from tabletop 1. Furthermore any or all of the output devices 13 may be provided within a water-proof, water-resistant or water-tight enclosure to prevent damage to such devices 13 from liquids, such as drinks, cleaning solutions, and the like.

Tabletop 1 may accommodate other types of devices, such as a currency acceptor 2 for accepting a currency value from a user of the devices in tabletop 1. The currency acceptor 2 may be, but is not limited to, any one or more of a deposited coin acceptor, a deposited currency note acceptor, a credit card reader, a debit card reader, a smart card reader, a telephone calling card or pre-paid telephone card reader. The currency acceptor 2 may be a physical device. In the alternative, currency acceptor 2 may instead be implemented by software which accepts a financial account identifier from a user and processes payment based thereon. The currency acceptor 2 accepts a currency value from the user and transmits the value to a central processing system or the like which controls the devices housed in tabletop 1. The currency value may be received as a payment for a service. Examples of services that may be provided by these devices include, but are not limited to, any one or more of Internet access, games, telephone access, a rental of an input device, a restaurant bill, and a product ordered through the computer.

Other devices that may be used in conjunction with the present invention include a two-way telephone (not shown), such as a standard telephone, a cellular telephone, a digital wireless telephone or an Internet telephone device of the type provided by NET2PHONE and the like. Also, a receiver for receiving television or radio transmissions, either by wireless communications or via the Internet may be accommodated by the devices in tabletop 1. Various other useful devices that may be used will be apparent to one of ordinary skill in the art.

Figure 2:
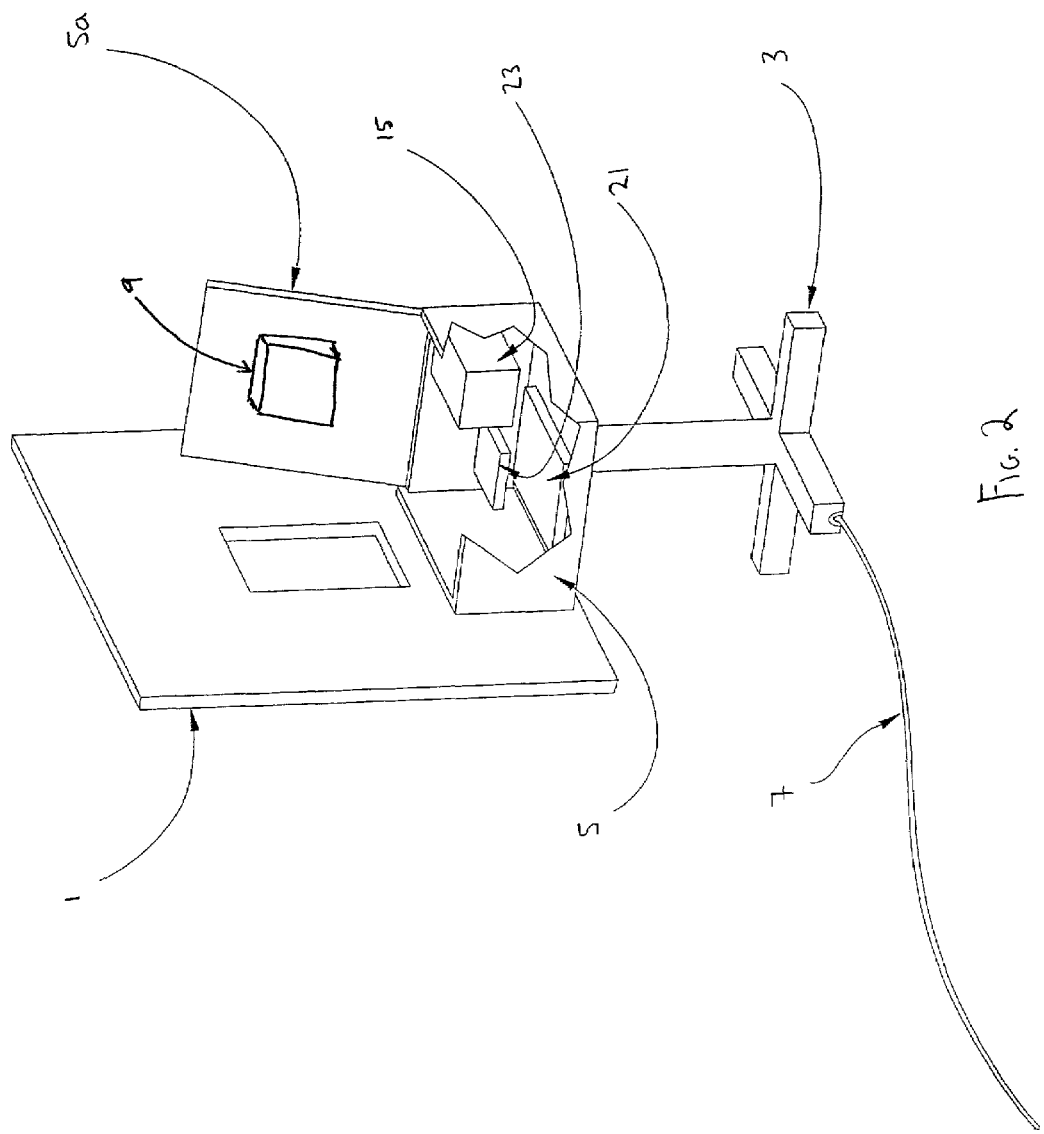
FIG. 2 is an illustration of exemplary internal components of the tabletop device of FIG. 1.

Referring now to FIG. 2, therein is shown a preferred assembly of an embodiment of the present invention as displayed in FIG. 1. Tabletop 1 may be hinged to or detachable from frame 5. Frame 5, in turn, may contain a frame lid 5a in which display 9 may be secured. Frame lid 5a may furthermore be hinged or detachable from frame 5.

Within the frame 5, there may disposed one or more components of a central processing system (CPS) 17, which may include a processor 21, a memory 23 and a power supply 15 for operating the CPS 17. Alternatively, the CPS 17 may be disposed at a remote location, in which case the cord 7 may transmit two-way communications between input devices 11, the remote CPS 17 and output devices 13, including the display 9.

Figure 3:
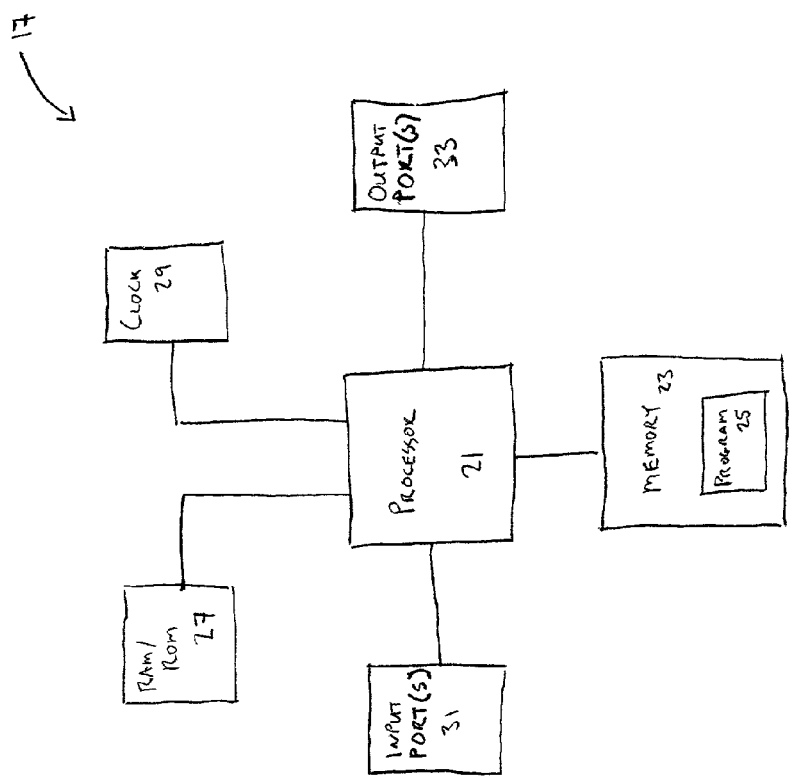
FIG. 3 is an exemplary block diagram of the processing system disposed within the tabletop device of FIG. 1.

Referring now to FIG. 3 therein is depicted an exemplary CPS 17. The CPS 17 is operative to receive program instructions and user inputs, such as customer orders, payment information and the like, and is further operative to output results corresponding to such instructions and display the same on display 9 or output devices 13. The processor 21 may be any commonly available microprocessor such as the PENTIUM III manufactured by INTEL CORP. The processor 21 is operatively connected to RAM/ROM 27, a clock 29, a memory 23 (which stores one or more programs 25), input port(s) 31 and output port(s) 33.

The random-access memory (RAM) portion of RAM/ROM 27 may be a suitable number of Single In-line Memory Module (SIMM) chips having a storage capacity (typically measured in kilobytes or megabytes) sufficient to store and transfer, inter alia, processing instructions utilized by the processor 21 and received from the program 25 during operation of the CPS 17. The read-only memory (ROM) portion of RAM/ROM 27 may be any permanent non-rewritable memory medium capable of storing and transferring, inter alia, processing instructions performed by the processor 21 during a start-up routine of the CPS 17. Further functions of RAM/ROM 27 will be apparent to one of ordinary skill in the art.

The clock 29 may be an on-board component of the processor 21 which dictates a clock speed (typically measured in MHz) at which the processor 21 performs and synchronizes, inter alia, communication between hardware components of the CPS 17. Further functions of the clock 30 will be apparent to one of ordinary skill in the art.

The input port(s) 31 may be one or more commonly known devices used for receiving computer data from an input device 11 and transmitting the same to the CPS 17. Accordingly, the input port(s) 31 may include a keyboard port, a mouse port, a port for a voice recognition unit, a parallel or serial communication port, a network communication port and any other appropriate network or other communication card for receiving data. Input port(s) 31 are operative to allow a user to input instructions and values in accordance with the present invention.

Output port(s) 33 may be one or more commonly known devices used by the CPS 17 to communicate the results of entered instructions and values to a user of the CPS 17. Accordingly, the output port(s) 33 may include a display port connected to the display 9, a voice synthesizer port connected to a speaker which comprises output device(s) 13, a printer port connected to a printer comprising output device(s) 13, a parallel or serial communication port, a network connection and any other appropriate network or other communication card for sending data. Output port(s) 33 are operative to allow a user to receive the results of user instructions in accordance with the present invention.

The memory 23 may be an internal or external large capacity memory for storing computer data, the storage capacity of which is typically measured in megabytes or gigabytes. The memory 23 stores, inter alia, a program 25 which may be any one or more of an operating system such as WINDOWS NT by MICROSOFT CORP, and one or more application programs, such as INTERNET EXPLORER 5.0 by MICROSOFT which are necessary to implement the embodiments of the present invention. Accordingly, the memory 23 may be one or more of the following: a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 23 will be apparent to one of ordinary skill in the art.

Figure 4B:
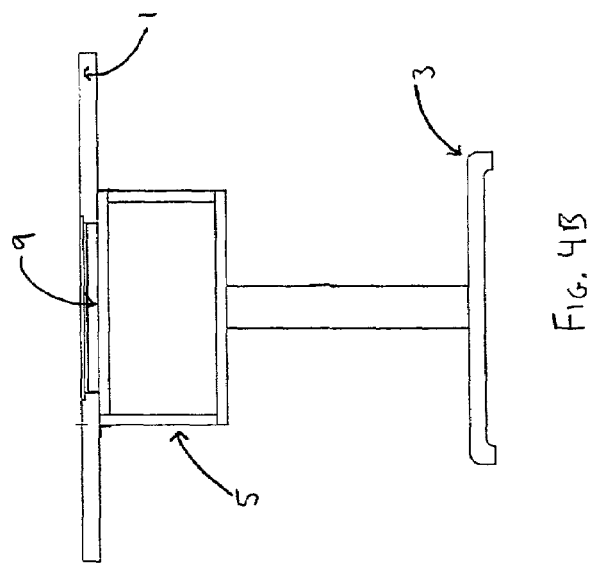
FIGS. 4A and 4B are an exemplary illustration of the top view and side view, respectively, of the tabletop device of FIG. 1.
Figure 4A:
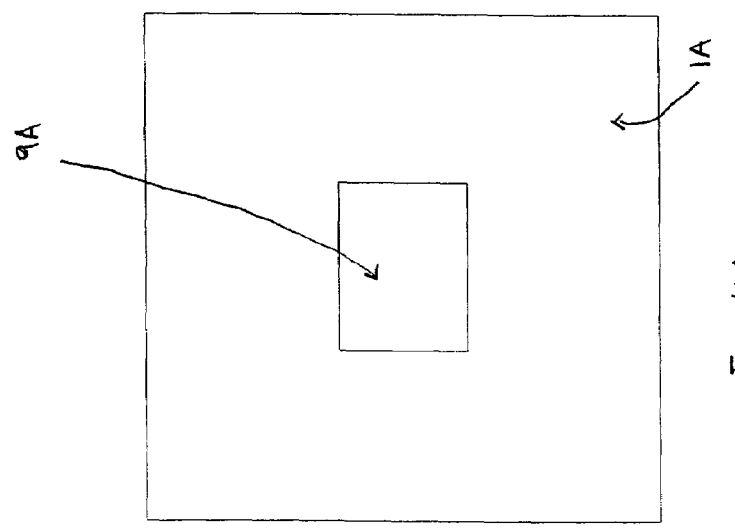

Turning now to FIGS. 4A and 4B, therein is depicted a side view of the embodiment of the present invention as displayed in FIGS. 1 and 2. In accordance with FIG. 4A, tabletop 1 may be provided with a water-proof, water-resistant and/or water-tight cover 1A. Cover 1A is preferably a smooth, flat surface which may accommodate, dining, drinking and the like thereon. The cover may be of any color or material. However, in accordance with the present invention, it is preferable to provide at least a transparent or translucent section 9A to accommodate viewing of the display 9.

Figure 5B:
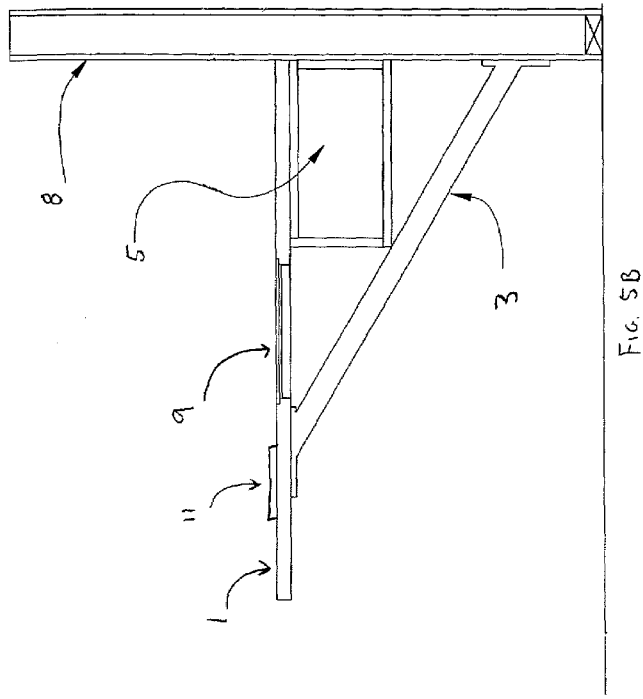
FIGS. 5A and 5B are exemplary illustrations of the top view and side view, respectively, of a second embodiment of a tabletop device of the present invention.
Figure 5A:
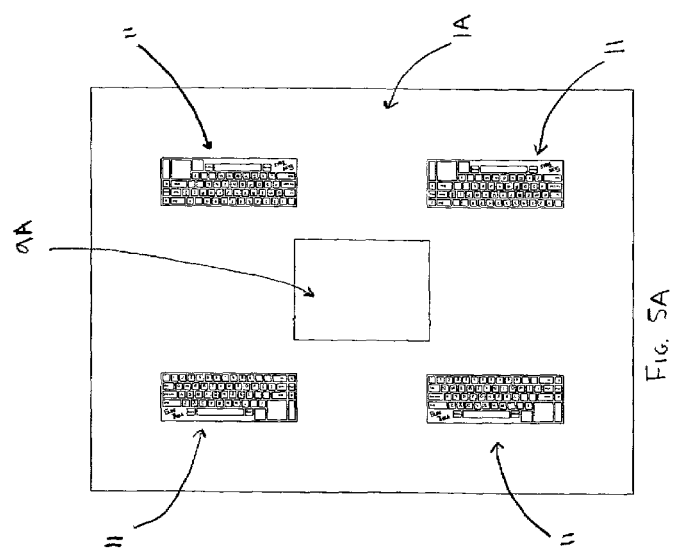

Turning now to FIGS. 5A and 5B, therein is depicted a further embodiment of the present invention. Tabletop 1 is affixed in any known manner to a wall 8. A base 3 provides support from the wall 8 rather than a floor, as in the previous embodiment. The cord 7 may be wired to the components in the frame 5 through either or both of the wall 8 and the base 3. In addition, a plurality of input devices 11 are provided to accommodate a plurality of seating locations. The display 9, as viewed through section 9a may be oriented to any of the seating positions. In a particular embodiment, the input devices 11 include a viewing orientation selection switch which allows any of the plurality of users to change the orientation of the display 9 to their seating position. The viewing orientation selection switch may cause an image on the display 9 to be rotated to favor a particular seaating position. In an alternate embodiment, the viewing orientation selection switch may cause the display 9 to be physically rotated to favor a particular seating position.

In addition, a lockout device comprising input device(s) 11 may be present at one or more of the seating locations to lock the viewing orientation to favor a particular seating position or to lock other user's input device(s) 11 in favor of one user only.

FIGS. 6A and 6B display a third exemplary embodiment wherein tabletop 1 and cover 1A are circular, rather than square or rectangular. It will be appreciated that tabletop 1 and cover 1a may be provided in any useful configuration or shape.

Figure 7:
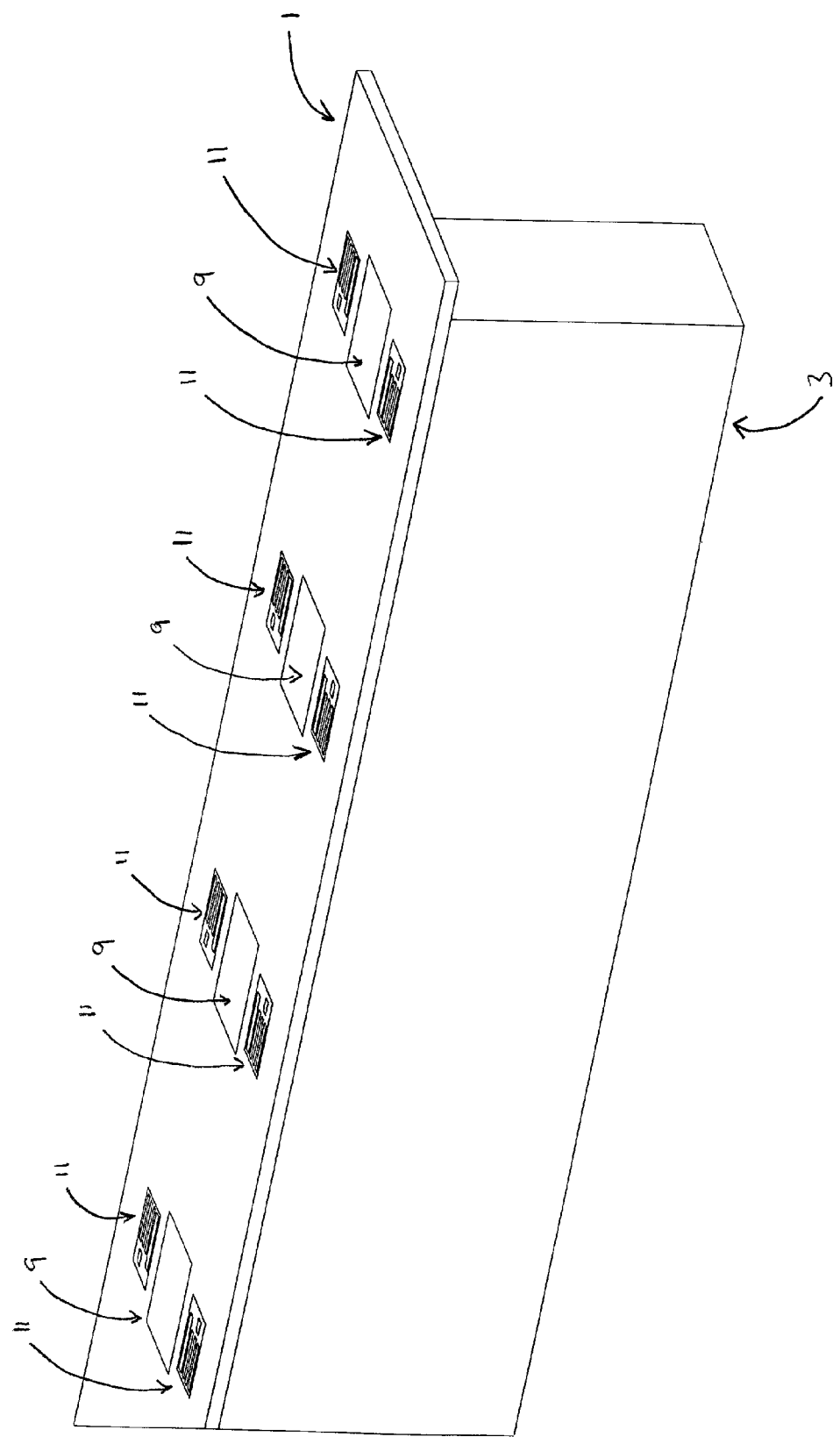
FIG. 7 is a perspective view of an exemplary fourth embodiment of a tabletop device of the present invention.

FIG. 7 displays a fourth exemplary embodiment wherein a plurality of displays 9 are accommodated by one tabletop 1. Each of the displays 9 accommodates, for example, two users by providing two sets of input devices 11 at each display. More or fewer users may be accommodated by provide additional or fewer input devices. The displays 9 and each of their accompanying central processing system 17 may be networked together through a common network server (not shown). In such case, the common network server may, among other things, monitor usage of each CPS 17, calculate and/or record charges incurred by and payments deposited by users of each CPS 17, prevent certain information from being displayed at each CPS 17, provide advertising that may be displayed on each display 9, and offer access to any number of online data sources such as specialized search engines, Internet radio or television broadcast and the like.

In the alternative, any one or more of the CPS' 17 may be individually connected to, for example, an Internet service provider and the like. In this configuration, or in the networked scheme described immediately above, a user of a CPS 17 may interact with any online service provider or the like to retrieve and send any sort of data that is commonly transmitted over, for example, the Internet.

Although the invention has been described in detail in the foregoing embodiments, it is to be understood that they have been provided for purposes of illustration only and that other variations both in form and detail can be made by those skilled in the art without departing from the spirit and scope of the invention, which is defined solely by the appended claims.

We claim:

1. A housing for an interactive computer system, comprising:
    a tabletop having an opening there through;
    a display oriented to be viewed through the opening in the tabletop and displaying an image thereon;
    a frame located below the tabletop and supporting the display;
    a viewing orientation selector changing the viewing orientation of the image independent of the display; and
    a base for supporting at least a portion of the tabletop and the frame, the base having a first end, a second end and a hollow section disposed between the first and second ends in which the frame is located, the hollow section adapted for receiving a cord including at least one of: a network communication line, a telecommunications line or an electrical transmission line.

2. The housing of claim 1, wherein the frame is positioned to allow the display to be oriented in a substantially vertical alignment compared to the tabletop.

3. The housing of claim 1, wherein the frame is positioned to allow the display to be oriented at a predetermined angle from a seating position of the tabletop.

4. The housing of claim 1, further comprising:
    a telephone operatively connected to the cord.

5. The housing of claim 1, further comprising:
    the cord, wherein the cord provides at least one of electrical power or display data to the display.

6. The housing of claim 1, further comprising:
    at least one of: a water-resistant, a water-proof or water-tight surface disposed over the opening in the tabletop for enclosing the display within the tabletop.

7. The housing of claim 6, wherein the surface is substantially flat.

8. The housing of claim 6, wherein the surface comprises at least one of: a transparent or a translucent material through which the display may be viewed.

9. The housing of claim 1, wherein the frame is arranged for supporting a computer.

10. The housing of claim 9, further comprising the computer.

11. The housing of claim 10, further comprising:
    the cord, and wherein the cord provides at least one of electrical power or network data to the computer.

12. The housing of claim 11, wherein the cord is further provided for transmitting network data from the computer.

13. The housing of claim 10, further comprising:
    an input device for transmitting command data to the computer, the command data being entered by a user.

14. The housing of claim 13, wherein the input device is a keyboard.

15. The housing of claim 14, wherein the keyboard is disposed within the tabletop.

16. The housing of claim 14, wherein the keyboard is disposed within at least one of: a water-proof, a water-tight, or a water-resistant covering.

17. The housing of claim 14, wherein the input device is at least one of a touch pad, a touch-screen, a mouse or a camera.

18. The housing of claim 14, wherein the input device is a lockout device for preventing at least one of: a change in a viewing orientation of the display or an input from a second input device.

19. The housing of claim 14, wherein the input device is a receiver for receiving wireless input signals from a remote device.

20. The housing of claim 10, further comprising:
    an output device including at least one of: a speaker, a television signal receiver, a radio signal receiver or a printer.

21. The housing of claim 10, further comprising:
    a currency acceptor for accepting a currency value from at least one of: a deposited coin, a deposited currency note, a credit card, a debit card, a smart card, a telephone calling card, a financial account identifier or a pre-paid telephone card, the currency acceptor for transmitting the currency value to the computer as a payment for a service.

22. The housing of claim 21, wherein the service includes at least one of:
    an Internet access, a rental of an input device, a rental of a game, a restaurant bill, or a product ordered through the computer.

23. The housing of claim 10, wherein the computer comprises a communication port operatively connected to the cord for transmitting data between the computer and a network.

24. The housing of claim 23, wherein the network comprises at least one of:
    a local-area network, a wide-area network, an Internet or an Intranet.

25. The housing of claim 24, wherein the computer receives access limitation data from a server connected to the network.

26. The housing of claim 10, wherein the computer stores user login data for a predetermined time.

27. The housing of claim 26, wherein the predetermined time is substantially a difference between a user login time and a user logoff time.

28. The housing of claim 1, further comprising:
the cord for connecting the display to a remote server; and
an input device connected to the remote server via the cord, the cord for transmitting a command signal from the input device to the remote server and for transmitting a display signal from the remote server to the display.

29. An interactive computer system, comprising:
a tabletop;
a display disposed within the tabletop for providing an image; and
a viewing orientation selector for changing an orientation of the image independent of the display to accommodate a plurality of seating positions.

30. The system of claim 29, wherein the display has a substantially vertical alignment in comparison to the tabletop.

31. The system of claim 29, wherein the display is oriented at a predetermined angle from a seating position of the tabletop.

32. The system of claim 29, further comprising: at least one of: a water-proof, a water-resistant or a water-tight surface disposed above the tabletop for enclosing the display within the tabletop.

33. The housing of claim 32, wherein the surface is substantially flat.

34. The housing of claim 32, wherein the surface comprises at least one of: a transparent or a translucent material, with the display visible there through.

35. The system of claim 29, further comprising the computer.

36. The system of claim 35, further comprising:
an input device for transmitting command data to the computer, the command data being entered by a user.

37. The system of claim 36, wherein the input device is a keyboard.

38. The system of claim 37, wherein the keyboard is disposed within the tabletop.

39. The system of claim 37, wherein the keyboard is disposed within at least one of: a water-proof, a water-resistant or a water-tight covering.

40. The system of claim 36, wherein the input device is a lockout device for preventing at least one of: a change in the orientation of the image or an input from a second input device.

41. The system of claim 36, wherein the input device is a receiver for receiving wireless input signals from a remote device.

42. The system of claim 36, wherein the input device is at least one of a touch pad, a touch-screen or a camera.

43. The system of claim 29, further comprising:
an output device including at least one of: a speaker, a television signal receiver, a radio signal receiver or a printer.

44. The system of claim 29, further comprising:
a currency acceptor for accepting a currency value from at least one of: a deposited coin, a deposited currency note, a credit card, a debit card, a smart card, a telephone calling card, a financial account identifier or a pre-paid telephone card, the currency acceptor transmitting the currency value to the computer as a payment for a service.

45. The system of claim 44, wherein the service includes at least one of:
an Internet access, a rental of an input device, a rental of a game, a restaurant bill, or a product ordered through the computer.

46. The system of claim 29, wherein the computer comprises a communication port operatively connected to a cord for transmitting data between the computer and a network.

47. The system of claim 46, wherein the network comprises at least one of: a local-area network, a wide-area network, an Internet or an Intranet.

48. The system of claim 47, wherein the computer receives access limitation data from a server connected to the network.

49. The system of claim 29, wherein the computer stores user login data for a predetermined time.

50. The system of claim 49, wherein the predetermined time is substantially a difference between a user login time and a user logoff time.

51. The system of claim 29, further comprising:
a cord for connecting the display to a remote server; and
an input device connected to the remote server via the cord, the cord for transmitting a command signal from the input device to the remote server and for transmitting a display signal from the remote server to the display.

52. The system of claim 29, further comprising: a telephone.

* * * * *

UNITED STATES PATENT AND TRADEMARK OFFICE
CERTIFICATE OF CORRECTION

PATENT NO. : 7,080,774 B1
APPLICATION NO. : 09/441834
DATED : July 25, 2006
INVENTOR(S) : Joseph Abboud et al.

It is certified that error appears in the above-identified patent and that said Letters Patent is hereby corrected as shown below:

Title Page, item [73]
In the Assignee:

**Delete "Wu Li Investments, Las Vagas, NV" and substitute
-- Wu Li Investments, Las Vegas, NV --.**

Signed and Sealed this

Twenty-first Day of November, 2006

JON W. DUDAS
*Director of the United States Patent and Trademark Office*